United States Patent Office 2,856,326
Patented Oct. 14, 1958

2,856,326

LACTATE COMPOSITION FOR TREATMENT OF BOVINE KETOSIS

Joseph C. Shaw, Washington, D. C., assignor, by mesne assignments, to National Dairy Products Corporation, New York, N. Y., a corporation of Delaware No Drawing. Application March 19, 1956
Serial No. 572,238

8 Claims. (Cl. 167—53)

This invention relates to a lactate composition for the treatment of bovine ketosis, and to a process for treating bovine ketosis by administration of a calcium-sodium-ammonium-lactate composition.

It has been estimated that the economic loss due to ketosis (otherwise called acetonemia) in diary cattle amounts to $9,000,000 per year in milk loss and veterinary fees. Ketosis affects cows of all ages. The overall incidence varies from 5 to 15%, usually, but occasionally even 40% of one herd may suffer one or more attacks. The disease is seasonal, being most prevalent between November and May, and usually occurs ten days to six weeks after calving, with only occasional cases reported when the cows are on summer pasture.

The most common symptoms are a rapid decrease in milk production and a loss of weight. Appetite may be poor or depraved, and there is usually rumen inactivity and constipation. The cow may become depressed, appearing wild and easily frightened. In some of the nervous cases the back may be arched, and incoordination, particularly of the hind legs, may also occur.

The blood picture is most revealing, and usually is utilized in determining the effectiveness of the treatment. During ketosis the blood will show a decrease in sugar and an increase in ketones; hence the name. The blood sugar level may drop from a normal of about 45 to 60 mg. per 100 ml. to a low of about 20 mg. per 100 ml., while the ketones increase from the 3 to 6 mg. per 100 ml. norm to a higher of 60 to 70 mg. per 100 ml. Post-mortem examination of deceased cows show a fatty liver, and there may also be some degeneration of certain endocrine glands, such as the pituitary and adrenal cortex.

The Ross urine test which tests for acetone in the urine is the common diagnostic test for ketosis. Ammonium sulfate containing 1% sodium nitroprusside is added to 5 ml. of urine. When this has dissolved a flake of sodium hydroxide is introduced. The intensity of the purple color of the solution indicates the severity of the ketosis, an absence of color indicating no ketosis.

Several methods have been suggested for the treatment or prevention of ketosis. The administration of corticoids, such as cortisone, hydrocortisone and ACTH, and of glucocorticoids such as metacortandracin and 9-δ-fluorohydrocortisone has been shown to be effective. Shaw, Hatziolos and Chung, "Studies on Ketosis in Dairy Cattle. XV. Response to Treatment with Cortisone and ACTH," Science, 114: 575–576 (1951); Shaw, Gessert and Chung, "Studies on the Etiology and Treatment of Ketosis in Dairy Cows," Proc. Am. Vet. Med. Assn., August 23–26 (1954), pp. 78–81; Shaw, Hatziolos, Leffel, Chung and Gilbert, "Studies on Ketosis in Dairy Cattle. XVI. The Pituitary-Adrenal Cortical Syndrome," N. Am. Vet., 34: 251–256 (1953); Shaw, Hatziolos, Leffel, Chung, Gill and Gilbert, "Pituitary-Adrenal Cortical Syndrome in Ketosis of Dairy Cows," Md. Agr. Exp. Sta. Misc. Cir., 139, pp. 1–19 (1952); Shaw, Ozanlan, Christiansen and Righetti, "Studies on Ketosis in Dairy Cattle. XIX. Glucocorticoids and ACTH Therapy in the Los Angeles Area," J. Am. Vet. Med. Assn., in press; and Shaw et al., Miscellaneous Publication No. 238, June 1955, University of Maryland. However, this treatment is expensive. Massive daily doses, of the order of 1500 mg., usually have been required, and each dose is therefore costly. At the present time, such a treatment is impractical for large herds.

Seekles, Veterinary Record, 63, 494 (1951), describes the use of ammonium lactate in the treatment of ketosis. He indicates that such therapy has been practiced since 1942 in numerous cases in The Netherlands, and as a rule with good results. However, the ammonium lactate has a diarrhetic effect, and the ammonium ion is ketogenetic and therefore tends to offset any effectiveness due to the lactate radical. The ketogenicity of ammonia has been reviewed by Greenberg (Chemical Pathways of Metabolism, volume 1, page 337).

Sodium propionate is presently being offered as an effective preventative agent for ketosis, and for this purposes is administered in dairy feeds. However, the propionate is unpalatable to the cow, so that the limit of addition which is acceptable to the cow is insufficient to afford satisfactory prevention.

In order for a substance to be useful as a preventative or cure for bovine ketosis, in addition to its therapeutic effect it should also have a satisfactory flavor characteristic, so that it can be fed to the cow in the feed in the quantity necessary to effect a cure. It should have no undesirable side effects, and in particular should not be diarrhetic. Its physical characteristics should be such that it can readily be mixed with the feed, and will be highly soluble, so that it can be administered as a drench to animals which have already reached a stage where they refuse their feed.

In accordance with the invention, a lactate composition is provided having an optimum palatability to the cow, a high water-solubility and which is effective either as a cure or as a preventative in satisfactory amounts without undesirable after-effects such as diarrhea. This composition consists essentially of a mixture of calcium lactate and sodium lactate or calcium lactate and ammonium lactate or calcium lactate and a mixture of sodium and ammonium lactates in the proportions of from 15 to 85% calcium lactate and from 85 to 15% total sodium lactate and/or ammonium lactate. The composition in accordance with the invention is administered orally by mixing in the feed or as a drench or in capsule or bolus form. The physical condition of the composition is not critical.

The composition can be prepared by simple mixing of calcium lactate with sodium lactate or ammonium lactate or a mixture of the two in the proportions indicated. If a very pure composition is desired, the starting materials should be U. S. P. grade. However, in many instances a less pure commercial material will be satisfactory, and in this event the starting materials can be utilized in various forms, according to their availability and cost.

Sodium lactate is available as a 50% aqueous solution and would usually be used in this form. Solutions containing less water are quite resinous, and are not readily mixed with calcium lactate. Pure ammonium lactate, like sodium lactate, also is a liquid or resinous material, and usually is supplied as a 75 to 80% aqueous solution.

In one method, calcium lactate is dissolved in water and mixed with an aqueous solution of either sodium or ammonium lactate, or with both if a mixture of the two is desired. This solution can be used as such or it can be spray-dried to recover the dry mixture.

In the following discussion, it will be understood that the corresponding ammonium compounds can be substituted in whole or in part for the sodium compounds referred to.

The product also can be prepared by dissolving calcium lactate pentahydrate in water with the aid of sodium carbonate or sodium sulfate. The excess calcium is eliminated by the formation of a precipitate of calcium sulfate or calcium carbonate, and the sodium salt can be added in an amount to produce a mixture of sodium and calcium lactates in the final product in the desired proportion. The solution can be filtered to remove the calcium salt precipitate, and then used as such. It can be spray-dried if desired.

A delactosed, deproteinated whey also can be used as a starting material. The preparation of such a whey is described in the Weisberg et al. Patent No. 2,071,368, dated February 23, 1937. This product is neutralized with calcium and sodium hydroxides in the proportions to give the desired sodium lactate-calcium lactate ratio, and the product spray-dried.

For drenching, this composition can be dissolved directly in water. It can also be administered with a feed.

The amount of the composition of the invention which can be administered with the feed is not critical, but enough would be used to obtain the desired preventative or curative effect, while at the same time not administering excessive amounts, i. e., amounts in excess of two pounds of calcium lactate and one pound of sodium lactate per animal per day. Usually, an amount in the range from about 5 to about 15% in the feed is satisfactory for a good preventative effect.

For administration with the feed, a finely granular material is better than a finely ground or dusty material. Cows frequently object to a dusty composition. The granular material also is better for drenching purposes, and for mixing and pouring. Fine powders produced by spray-drying or by attrition of a spray-dried powder can be agglomerated by steaming. The material is sent through a tunnel dryer, wherein steam is admitted under whose influence the powder is wetted and the particles fuse and coalesce together, forming granules as they pass through the dryer.

Calcium lactate alone can be used for the treatment of bovine ketosis, with both a preventative and a curative effect in treating mild cases. It is, however, only very slightly soluble in water, with the result that it is difficult to get a sufficient quantity of the calcium lactate into the animal without also adding tremendous quantities of liquid. When it is fed as a slurry, solubility does not apparently occur in the rumen, and proper curative effects in serious cases frequently are not obtained. In experiments with fistulated cows, the addition of calcium lactate did not result in a change in the blood sugar level during the course of the experimental period.

On the other hand, sodium lactate is considerably more soluble in water, is an effective cure for ketosis, and will result in marked increases in blood sugar, using healthy fistulated cows as the experimental animals. However, the administration of sodium lactate, like the administration of ammonium lactate, results in drastic diarrhea, which is an unfortunate side-effect, making it impossible to utilize this material by itself. Moreover, sodium lactate is a liquid, which makes its administration in feeds more difficult.

A mixture of calcium lactate with sodium and/or ammonium lactate in accordance with the invention is completely soluble in water, the relative insolubility of calcium lactate not being evident. At the same time, the mixture is fully palatable to the cow, and there are none of the after-effects which would be expected due to the presence of sodium and/or ammonium lactate. Thus, the combination of the materials is superior to either material alone, because of the unexpectedly high palatability, solubility and absence of after-effects, and can be effectively used both for preventative and for curative treatment.

In the case of preventative treatment, the composition of the invention would be mixed in the feed in the amount of about 5 to about 15% by weight, although as much as 25% can be used. This ration then is fed to the cows, starting approximately a week after parturition and continuing for up to three weeks after calving. A typical calving ration is as follows:

| | |
|---|---:|
| Ground corn _____lbs__ | 590 |
| Ground oats _____lbs__ | 500 |
| Wheat bran _____lbs__ | 500 |
| Linseed meal _____lbs__ | 360 |
| Bone meal (or other safe phosphrous supplement) _____lbs__ | 20 |
| Ground limestone _____lbs__ | 10 |
| Salt _____lbs__ | 20 |
| Total _____lbs__ | 2,000 |
| Digestible protein _____percent__ | 13.3 |
| Total digestible nutrients _____do____ | 71.8 |

When preventative treatment has been lacking, and ketosis has already affected the animal, a curative treatment by drench is necessary. In this case the composition of the invention can be mixed with several times its weight of water, in the proportion of, say, 25 parts to 75 parts of water, and one quart of this mixture immediately fed to the cow by drench twice a day until the metabolic derangement has been arrested, and the cow has regained her normal appetite. After this point, the product may again be administered as a portion of the feed.

Calcium lactate alone can be administered in the same way as the composition of the invention, but it is not nearly as effective, and will give good results, if at all, only in mild cases.

The compositions of the invention and their use are shown in the following examples which represent the best mode in the opinion of the inventor of his invention:

EXAMPLE 1

Whey (100 lbs.) from a casein operation was subjected to lactic acid fermentation by inoculating with *Lactobacillus bulgaricus*. The fermentation procedure used was as described in Patent No. 2,071,368 to Weisberg et al. The fermentation medium was held at 110° F., and the pH maintained at 5.5 by the addition of an aqueous slurry prepared from 1 part of sodium hydroxide, 1.34 parts of calcium hydroxide and 20 parts of water. The fermentation process was continued until all the lactose of the whey was transformed in to lactate salts. The total fermentation liquid was pasteurized at 160° F. for ten minutes, and condensed in vacuum equipment to a thick syrup having about 40% solids content.

This material was spray dried, using an inlet temperature of 310° F., and an outlet temperature of 180°-200° F., with a throughput of 5-7 gallons/hour, through a high pressure nozzle, at a feed temperature of 150° F. A slightly tan colored powder was recovered, which had the following analytical composition:

| | Percent |
|---|---:|
| Ash _____ | 40.56 |
| Sodium _____ | 6.83 |
| Calcium _____ | 9.32 |
| Solids _____ | 96.67 |
| Lactate _____ | 52.26 |

This material was mixed into a suitable calving ration, at a 5% level, composed of equal parts by weight of ground oats, wheat bran and cottonseed meal. The resulting ration when fed to cows possessed ketosis-preventive properties.

EXAMPLE 2

A second product was made from 100 lbs. of cottage cheese whey as follows:

The whey was fermented by inoculating with *Lactobacillus bulgaricus* as in Example 1. After lactic acid fermentation was finished, the acidity of the fermentation mixture was adjusted to pH 6.8 by the addition of an aqueous lime slurry. This fluid was heated to 200° F. The heating rendered a portion of the whey proteins and a portion of the whey salts insoluble. These were removed by centrifuging, and the centrifugate pasteurized and dried as in Example 1.

EXAMPLE 3

1263 g. of calcium lactate U. S. P. and 169.6 g. of sodium carbonate anhydrous were mixed in 2500 ml. of 100° F. water, and the temperature raised to 180° F. After one half hour the calcium carbonate which precipitated was filtered off and the filtrate condensed and spray dried as in Example 1. This is a product of high purity.

EXAMPLE 4

Whey (50 lbs.) derived from cottage cheese manufacture was neutralized to pH 6.5 by addition of calcium hydroxide fermented with *L. bulgaricus* at 110° F., with addition of alkali from time to time to maintain the pH at 6.5. It was then heated at 220° F. until coagulation of proteinaceous material had ceased.

The insoluble fractions were separated by sedimentation, and a subsequent filtration. This filtrate was then treated at 200° F. with charcoal, and adjusted with lime to a pH of 11 to 12 until a definite coagulation took place. After filtration the material was neutralized with lactic acid.

The filtered clear solution was condensed in vacuum equipment and further processed and dried as in Example 1.

A white powder was recovered, the analytical data on which were as follows:

|   | Percent |
|---|---|
| Ash | 44.02 |
| Sodium | 7.44 |
| Calcium | 10.14 |
| Lactate | 62.61 |
| Solids | 95.53 |

This material can be used in feeds, as described in Example 1.

EXAMPLE A

Studies were conducted on the efficiency of calcium lactate administered per os as a treatment for bovine ketosis. The studies all involved the administration of warm aqueous 38% calcium lactate solutions by drench to insure that all cows received the prescribed dosage. The dosage and duration of treatment were varied to obtain information on the optimum for both. As noted under "Response" in Table I, calcium lactate was highly effective when given at a level of 2 lbs. on the first day and 1 lb. per day for 7 to 8 days, 14 to 16 cows showing good recovery. Treatment for shorter periods of time were not as effective, although most of the cows exhibited good initial responses.

*Table I.—Efficiency of calcium lactate per os for the treatment of ketosis*

| Number of cows | Lactate dosage | Response | | Blood glucose (G) and urine ketone qualitative (K) on days post-treatment | | | |
|---|---|---|---|---|---|---|---|
| | | | | 0 | 1 | 4-6 | 7-10 |
| 14 | 2 lbs. on 1st day and 1 lb. for 7-8 days | Good recovery | G | 29.4 | 37.8 | 42.0 | 44.8 |
| | | | K | 3.8 | | 1.7 | 0.7 |
| 2 | do | Good clinical response—Retreated | G | 16.4 | 17.7 | 18.4 | 27.0 |
| | | | K | 4.0 | 4.0 | 3.5 | 3.0 |
| 1 | 2 lbs. on 1st day and 1 lb. for 5 days | Good response and relapse | G | 34.1 | | 40.2 | 26.6 |
| | | | K | 4.0 | | | 3.0 |
| 3 | 2 lbs. on 1st day and 1 lb. for 4 days | Good response—No retreatment | G | 20.7 | | | 34.0 |
| | | | K | 4.0 | | | 1.3 |
| 2 | 2 lbs. on 1st day and 1 lb. for 3 days | Good response | G | 19.9 | | 37.0 | |
| | | | K | 4.0 | | 3.0 | |
| 3 | 1 lb. on 1st day and ½ lb. for 4-6 days | Good response—No retreatment | G | 20.5 | 20.6 | 36.0 | 373. |
| | | | K | 4.0 | 4.0 | 2.7 | 2.0 |

Calcium lactate was palatable at 5 to 10% levels in the feed of Example 1, and at 20% levels when compressed into pill form and mixed into the grain.

EXAMPLES B AND C

The following data show the effect of sodium lactate alone (Example B) and of the composition of the invention (Example C) containing calcium and sodium lactates. Each administration was by drench, per os, using 25% and 20% aqueous solutions, respectively.

*Table II.—Example B.—Effect of large amounts of sodium lactate per os on cows with ketosis*

| Cow | Treatment (per os) | Blood glucose in mg. percent (G) and qualitative urine ketones (K)[1] | | | | | Comments |
|---|---|---|---|---|---|---|---|
| | | | Day of treatment | Days of post-treatment | | | |
| | | | | 1 | 2 | 3 | 4-6 | |
| 209 | 2½ sodium lactate on 0 day and 5 lb. per day next two days. | G, | 22.1 | 51.6 | | 69.1 | 60.0 | Remarkable response but relapse due to diarrhea. |
| | | K, | 4 | 3 | | 1 | 4 | |
| 126 | 1¼ lb. sodium lactate followed by 2½ lb. sodium lactate. | G, | 34.9 | 42.1 | | | 53.8 | Remarkable response but became too "loose" so had to discontinue treatment and so later relapsed. |
| | | K, | 4 | 1 | 1 | 1 | | |
| Westra | 2½ lb. sodium lactate | G, | 34.7 | | 43.7 | | | Remarkable response but developed diarrhea. |
| | | K, | 4 | | 0 | | | |
| Kopf 233 | 2½ lb. sodium lactate first day 1¼ lb. second day. | G, | 48.6 | 65.0 | | 62.2 | | Remarkable response and good recovery but was sick one day because of excess sodium lactate. |
| | | K, | 4 | 0 | | 0 | | |

[1] Urine ketones were evaluated on basis of qualitative test with classification of 0 for no reaction to 4 for maximum ketones.

Results on four cows above showed marked increase in blood glucose within 24 hours, and unprecedented decrease in urine ketones within one to three days, but sodium lactate in the amounts administered produced diarrhea.

acetic acid to 1 ml. of rumen fluid. Samples for volatile fatty acid determinations were preserved by adding 1 ml. of a saturated mercuric chloride solution to 9 ml. of rumen fluid. In the single experiment concerning in vitro dissimilation of sodium lactate, the cell suspension method

*Table III.—Example C.—Effect of composition of calcium lactate pentahydrate and sodium lactate (Ca-Na ratio 1:1) on first day and either the combination or calcium lactate thereafter*

| Cow | Treatment (per os) | Blood glucose in mg. percent (G) and qualitative urine ketones (K) [1] | | | | | Comments |
|---|---|---|---|---|---|---|---|
| | | Days of treatment | Days of post-treatment | | | | |
| | | | 1 | 3 | 4-6 | 7-11 | |
| Veldhius | ¾ lb. sodium lactate plus 1¼ lb. calcium lactate on first day followed by ½ lb. of calcium lactate for 11 days. | G, 27.0<br>K, 4 | 31.0<br>4 | | 36.1<br>3 | 43.0<br>1 | Good recovery. No adverse effects. |
| Clanton | ¾ lb. sodium lactate plus 1¼ lb. calcium lactate plus ½ that amount of each on following day. | G, 44.0<br>K, 3 | 50.0<br>0 | | 45.7<br>0 | | Excellent recovery. No adverse effects. |
| Simas | 2 lb. calcium lactate plus 1 lb. sodium lactate first day plus 1½ lb. calcium lactate daily for 4 days. | G, 28.0<br>K, 4 | 34.7<br>4 | 41.5<br>3 | | 44<br>0 | Good recovery. No adverse effects. |

[1] Urine ketones were evaluated on basis of qualitative test with classification of 0 for no reaction to 4 for maximum ketones.

The data of Table II show that sodium lactate alone is effective, but produces diarrhea. On the other hand, as shown in Table III, a mixture of calcium and sodium lactates in accordance with the invention is equally effective without adverse effects. Sodium lactate alone cannot be used for a curative effect because the after-effect produces a relapse which overcomes the initial favorable response. On the other hand, the mixture of calcium and sodium lactates produces an actual recovery without after-effects.

EXAMPLE D

The following data are the result of a study on the dissimilation and adsorption of lactic acid in the bovine rumen as well as the effect upon blood glucose levels.

Two permanently fistulated, non-pregnant cows, representing the Jersey and Holstein breeds, were used as experimental animals. They were fed according to Morrison's requirements, Feeds and Feeding, 21st edition (1948), on a ration of 8 lbs. alfalfa hay and 6 lbs. of a 16% protein concentrate mixture. The concentrate ration was fed twice daily except on days of experimental trials, when the morning feed was omitted. Hay was fed only in the evening, and in controlled amounts to insure complete consumption by 12 o'clock midnight. On trial days, water was withheld from the animals, starting at 12 o'clock midnight, and ending at 4:30 a. m., at which time they were allowed access to water for approximately 0.5 hour. The water then was removed, and an interval of approximately 3.5 hours was allowed before the start of the trial. This interval should have allowed sufficient time for the ingested water to reach an equilibrium within the animal. After the morning watering, the animals did not receive water until the end of the trial period. The cows remained at approximately constant weight and were in good health throughout the entire study.

Rumen liquor samples (500 ml.) were obtained via the fistula with the aid of a metal tube and rubber hose connected to an aspirator pump. Samples were taken prior to administration of substrate and at various intervals following substrate addition. Immediately after removal, the rumen liquor was strained through two layers of cheesecloth and then centrifuged at 1000 R. P. M. for 15 minutes to remove the residual feed particles. Several aliquot samples of the resultant supernatant liquid were preserved and saved for lactic acid and volatile fatty acid analyses. Samples for lactic acid determination were preserved by adding 0.1 ml. of 100% (X/V) trichloroof Doetsch et al., Maryland Agr. Expt. Stat. Misc. Pub., 238, 1 (1955), was employed.

The following methods of analysis were used: rumen and blood lactic acid, Barker and Summerson, J. Biol. Chem., 138, 535 (1941); volatile fatty acids, Keeney, Maryland Agr. Expt. Stat. Misc. Pub., 238, 23 (1955); blood glucose, Somogyi, J. Biol. Chem., 100, 695 (1933); modification of the Shaffer-Hartmann method.

All substrates used in this study were diluted with water to a volume of 1.5 to 2.0 l., and were then administered via the rumen fistula. The various forms of lactates used were as follows: Trials 1 and 2, a composition of 1.5 lbs. sodium lactate and 1.5 lbs. calcium lactate; Trial 3, 3 lbs. of calcium lactate.

Results of Trials 1 and 2 are summarized in Table IV.

*Table IV.—Changes in rumen fluid volatile fatty acids and lactic acid, and blood lactic acid resulting from the administrations, to fistulated cows, of a composition of 1.5 lb. sodium lactate and 1.5 lb. calcium lactate*

TRIAL 1

| Sampling time (hours) | Total VFA ($\mu$M/ml.) | Molar percent of total VFA | | | | Rumen fluid lactic acid ($\mu$M/ml.) | Blood lactic acid (mg. percent) |
|---|---|---|---|---|---|---|---|
| | | Acetic | Propionic | Butyric | Valeric plus higher acids | | |
| 0 | 60.6 | 68.0 | 16.4 | 12.4 | 3.2 | 0 | 10.2 |
| 0.5 | 57.5 | 64.9 | 19.0 | 13.1 | 3.0 | 205 | 20.8 |
| 2 | 56.0 | 59.5 | 22.9 | 14.0 | 3.6 | 160 | 26.0 |
| 5 | 58.3 | 50.6 | 27.1 | 20.6 | 1.7 | 64 | 20.8 |
| 8 | 69.7 | 43.1 | 29.3 | 26.6 | 1.0 | 44 | 17.0 |

TRIAL 2

| 0 | 72.9 | 67.0 | 16.4 | 14.2 | 2.4 | 0.2 | 6.1 |
| 0.5 | 62.4 | 65.3 | 17.5 | 12.5 | 4.7 | 152.0 | 13.4 |
| 2 | 64.2 | 58.1 | 22.3 | 18.0 | 1.6 | 120.0 | 19.6 |
| 5 | 77.8 | 47.2 | 27.1 | 24.0 | 1.7 | 56.0 | 28.4 |
| 8 | 92.6 | 38.7 | 31.5 | 28.6 | 1.2 | 0.97 | 12.4 |

In both trials, the concentration of acetic acid decreased approximately 25% and the concentrations of both propionic and butyric acids increased approximately 14% in 8 hours. A diminution in the concentrations of valeric plus higher acids was observed after 8 hours. Total VFA increased approximately 12 $\mu$M/ml. of rumen fluid in 8 hours for Trial 3. The reason for this difference in total VFA concentration is not apparent. During both trials, the rumen fluid lactic acid concentrations decreased gradually throughout the entire sampling period, and the blood lactic acid increased markedly in 2 to 5 hours. Since the decrease of lactic acid in the rumen fluid was closely correlated with the increase of lactic acid in the blood, it is my concept that the increased amounts of blood lactic acid were due to direct absorption.

A summary of the results of Trial 3 is presented in Table V.

Table V.—*Changes in rumen fluid volatile fatty acids and lactic acid, blood lactic acid, and blood glucose resulting from the administrations, to fistulated cows, of calcium lactate alone*

TRIAL 3

[3 lb. calcium lactate.]

| Sampling time (hours) | Total VFA ($\mu$M/ml.) | Molar percent of total VFA | | | | Rumen fluid lactic acid ($\mu$M/ml.) | Blood lactic acid (mg. percent) | Blood glucose (mg. percent) |
|---|---|---|---|---|---|---|---|---|
| | | Acetic | Propionic | Butyric | Valeric plus higher acids | | | |
| 0 | | | | | | | 2.4 | 47.7 |
| 0.5 | | | | | | | 3.4 | 42.6 |
| 2 | | | | | | | 9.4 | 41.3 |
| 5 | | | | | | | 5.0 | 46.4 |
| 8 | | | | | | | 3.6 | 41.3 |

The administration of calcium lactate resulted in a marked increase in propionic acid and a decrease in acetic acid within 2 to 5 hours. It should be noted that the administration of calcium lactate alone did not, in any instance, cause a significant increase in blood lactic acid or blood glucose.

Results of Trial 4 concerning the in vitro dissimilation of 400 $\mu$M of sodium lactate are presented in Table VI.

Table VI.—*Total production and molar percentages of the volatile fatty acids resulting from the in vitro dissimilation of 400 $\mu$M sodium lactate by two different cell suspensions prepared from the rumen fluid of an animal prior to and 5 hours following the fistular administration of 3 lb. sodium lactate*

| Sampling time for the rumen fluid used in the preparation of the cell suspensions (hours) | Total VFA ($\mu$M/ml.) | Molar percent of total VFA | | | |
|---|---|---|---|---|---|
| | | Acetic | Propionic | Butyric | Valeric plus higher acids |
| "0 hour"—endogenous | 14.8 | 59.8 | 15.6 | 12.3 | 12.3 |
| "0 hour"—plus substrate | 45.8 | 42.8 | 30.9 | 20.2 | 6.0 |
| "5 hour"—endogenous | 30.6 | 48.6 | 21.7 | 20.1 | 7.1 |
| "5 hour"—plus substrate | 58.7 | 36.3 | 26.9 | 32.2 | 4.6 |

Cell suspensions for this trial were prepared from rumen samples obtained during Trial 1. The first cell suspension ("0 hour") was prepared from the sample of rumen fluid obtained prior to the addition of the substrate; and the second ("5 hour") from the sample obtained 5 hours after addition of the substrate to the experimental animal. Dissimilations by both cell suspensions resulted in an increase in the concentrations of propionic and butyric acids and a decrease in the concentrations of acetic and valeric plus higher acids. Cells from the 0 hour rumen sample caused a greater increase in propionic acid than cells from the 5 hour rumen sample. Conversely, cells from the 5 hour rumen sample caused a greater increase in butyric acid than cells from the 0 hour rumen sample. The reason or reasons for these differences are not apparent. Total VFA production was approximately the same (30 $\mu$M/ml.) from both cell suspensions.

These studies indicate that degradation of lactates by bovine rumen micro-organisms results in increases of rumen VFA, mainly propionic and butyric acids. When the more soluble sodium lactate was administered, some degradation occurred and, in addition, large amounts of lactic acid appeared in the blood followed by increases in blood glucose. Since blood lactic acid increases were closely correlated with rumen lactic acid decreases, it is my concept that direct absorption of large amounts of lactic acid can occur. Failure of calcium lactate to cause significant increases in blood lactic acid values was thought to be due to its poor solubility. Since both calcium lactate and sodium lactate caused appreciable increases in propionic acid, while only sodium lactate caused marked increases in blood lactic acid and blood glucose, it appears that the increase in blood glucose is due primarily to absorption of lactic acid from the more soluble lactate and not from absorption of propionic acid. However, it is recognized that propionic acid may act as a glucose precursor as reported by Schultz and Smith, J. Dairy Sci. 34, 1191 (1951). The data reported herein indicated that although some of the lactate was degraded to propionate, the amount so produced and absorbed was not sufficient to affect blood glucose levels. These results are interesting in view of the fact that good results are obtained by administering calcium lactate per os as a treatment for bovine ketosis. It is suggested that the calcium-sodium lactate composition in accordance with the invention is more effective than is calcium lactate alone.

The results of the degradation of sodium lactate by cell suspensions of bovine rumen bacteria are of interest in that they appeared to go in the same direction as in vivo results. Quantitative differences existing between in vitro and in vivo results are probably due to adsorption occurring during in vivo trials. It appears that cell suspensions of bovine rumen bacteria are indicative of in vivo rumen occurrences.

The term "consisting essentially" as used in the claims means that the composition components named therein are the essential ingredients, and that there are and can be no components included in the composition that are not named which render the composition ineffective or deleterious or harmful in the treatment of bovine ketosis.

All percentages in the specification and claims are by weight.

I claim:

1. A process for the treatment of ketosis in bovine animals which comprises administering a composition consisting essentially of from about 15 to about 85% calcium lactate and from about 85 to about 15% of at least one member selected from the group consisting of sodium lactate and of ammonium lactate.

2. A process for the treatment of ketosis in bovine animals which comprises administering orally a composition consisting essentially of from about 15 to about 85% calcium lactate and from about 85 to about 15% of at least one member selected from the group consisting of sodium lactate and of ammonium lactate.

3. A process in accordance with claim 1 which includes administering the composition admixed with a feed.

4. A process in accordance with claim 1 in which the composition is administered by drenching.

5. A feed for administration to bovine animals for the treatment of ketosis, consisting essentially of bovine nutrient materials and an amount within the range from 5 to 15% of a composition consisting essentially of from about 15 to about 85% calcium lactate and from about 85 to about 15% of at least one member selected from the group consisting of sodium lactate and ammonium lactate.

6. A feed for administration to bovine animals for the treatment of ketosis, consisting essentially of bovine nutrient materials and an amount within the range from 5 to 15% of a composition consisting essentially of from about 30 to about 70% calcium lactate and from about 70 to about 30% of at least one member selected from the group consisting of sodium lactate and ammonium lactate.

7. A feed for administration to bovine animals for the treatment of ketosis, consisting essentially of bovine nutrient materials and an amount within the range from 5 to 15% of a composition consisting essentially of from about 15 to about 85% calcium lactate and from about 85 to about 15% sodium lactate.

8. A feed for administration to bovine animals for the treatment of ketosis, consisting essentially of bovine nutrient materials and an amount within the range from 5 to 15% of a composition consisting essentially of from about 15 to about 85% calcium lactate and from about 85 to about 15% ammonium lactate.

References Cited in the file of this patent

UNITED STATES PATENTS 1,559,478  Umber _____ Oct. 27, 1925

FOREIGN PATENTS 73,479  Austria _____ June 25, 1917

OTHER REFERENCES

Goodman: The Pharmacological Basis of Therapeutics, 2nd ed., 1955, Macmillan Co., N. Y. C., p. 811.

Drug and Cos. Ind., vol. 69, No. 4, p. 513, October 1951.

Hutyra: Pathology and Therapeutics of the Diseases of Domestic Animals, vol. III, 1938, pp. 445, 446, 467–469. Alex. Eger, Chicago, Ill.

Sollmann: A Manual of Pharmacology, 7th ed., 1948, p. 778, Saunders Co., Phila., Pa.

UNITED STATES PATENT OFFICE
CERTIFICATE OF CORRECTION

Patent No. 2,856,326                                            October 14, 1958

Joseph C. Shaw

It is hereby certified that error appears in the printed specification of the above numbered patent requiring correction and that the said Letters Patent should read as corrected below.

Column 1, line 44, for "show" read -- shows --; column 2, lines 19 and 20, for "purposes" read -- purpose --; column 3, line 71, for "the", second occurrence, read -- these --; column 4, line 54, for "in to" read -- into --; columns 5 and 6, Table 1, last column thereof, for "373." read -- 37.3 --; column 9, line 72, for "humen" read -- rumen --.

Signed and sealed this 6th day of January 1959.

(SEAL)
Attest:
KARL H. AXLINE

Attesting Officer

ROBERT C. WATSON
Commissioner of Patents